Oct. 14, 1969 J. L. HERRERO ET AL 3,473,142

ACTIVE PARALLEL-T FILTER HAVING SEPARATE FEEDBACK PATHS

Filed Dec. 13, 1967 2 Sheets-Sheet 1

INVENTORS.
JOSE LUIS HERRERO
BY GIDEON WILLONER
Glenn H. Antrim
ATTY.

United States Patent Office 3,473,142

Patented Oct. 14, 1969

3,473,142
ACTIVE PARALLEL-T FILTER HAVING SEPARATE FEEDBACK PATHS

Jose Luis Herrero, Mountain View, Calif., and Gideon Willoner, North Vancouver, British Columbia, Canada, assignors to Automatic Electric Laboratories, Inc., Northlake, Ill., a corporation of Delaware Filed Dec. 13, 1967, Ser. No. 690,193
Int. Cl. H03f 1/36
U.S. Cl. 330—107 1 Claim

ABSTRACT OF THE DISCLOSURE

To obtain minimum resistance in series with a shunt capacitor, the shunt capacitor of a resistive series arm is connected either directly to a common return circuit so that feedback from the output of a filter section is zero, or directly to an output buffer amplifier so that feedback ratio is one; and a shunt resistor of a capacitive series arm is connected in a separate feedback circuit through a potentiometer to the amplifier so that its feedback ratio can be determined independently. Since resistance in the return circuit of the shunt capacitor is minimum, the capacitor functions effectively as a true reactance.

BACKGROUND OF THE INVENTION

This invention pertains to electrical wave filters and more particularly to active parallel-T networks.

The characteristics of active parallel-T filters are described in an article entitled "A Simple Active Filter with Independent Control over the Pole and Zero Locations" by W. Farrer published in the April 1967 issue of Electronic Engineering, pages 219–222. The filters described in this article are like conventional parallel-T filters in that each section has a resistive series arm and a capacitive series arm. The filter is modified such that input voltage is divided so that the full signal voltage is applied to one arm and only a fraction of the signal voltage to the other. The filter has low-pass characteristics or high-pass characteristics according to which arm receives full input signal. The outputs of both the resistive arm and the capacitive arm are connected through a buffer amplifier to an output circuit and also through a potentiometer to both a shunt resistor and a shunt capacitor connected in the usual manner to the mid-points of the respective parallel arms of the T-network. Preferably, the gain of the buffer amplifier is one, and a potentiometer in the output of the amplifier is adjusted so that the voltage fed back to the shunt elements is less than the output voltage but not less than one-half the output voltage. Since the voltage divider, or potentiometer, in the output of the buffer amplifier is connected to both the shunt resistor and the shunt capacitor, resistance of the potentiometer is in series with the capacitor and decreases its effectiveness to provide gain within a passband and attenuation outside the passband. Therefore, high attenuation outside the passband equivalent to that obtained in conventional passive inductive-capacitive filters, is difficult to achieve in an active filter of this type.

SUMMARY OF THE INVENTION

The circuit in this invention is like the circuit described in the article mentioned above in that it has a series resistive arm, a capacitive series arm, a buffer amplifier having unity gain, and a feedback arrangement for connecting the output of the buffer amplifier to a shunt capacitor and to a shunt resistor. The feedback arrangement differs from that described in the article in that the shunt resistor alone is connected through a voltage divider, or potentiometer, to the output of the buffer amplifier, and the shunt capacitor is connected through a separate circuit to either the output of the buffer amplifier or to a common return circuit. With this arrangement the feedback ratio to the shunt resistor of the series capacitive arm can readily be adjusted individually to a desired value, between 0 and 1.0 times the output voltage, while a different amount of feedback can be applied to the shunt capacitor of the resistive series arm. Desirable attenuation characteristics are obtained when the ratio of feedback with respect to the shunt capacitor is either one or zero. When that feedback ratio is one, the shunt capacitor is connected directly to the output of the buffer amplifier, whereas, when that ratio is zero, the shunt capacitor is connected directly to the ground or common return lead. With either of these connections, the resistance in the return lead of the shunt capacitor is negligible so that the capacitor functions effectively as a true reactance. As shown below, three or four cascaded sections of parallel-T filters according to this invention provide attenuation characteristics comparable to that supplied by conventional passive inductive-capacitive networks.

In a preferred embodiment of a high-pass filter section, two bias resistors are connected to the mid-point of the resistive arm to function as a bias network for the succeeding buffer amplifier. The values of these resistors and the values of the usual components of the parallel-T network are calculated to provide the desired R values for the network.

DESCRIPTION OF THE PREFERRED EMBODIMENT

Figure 1:
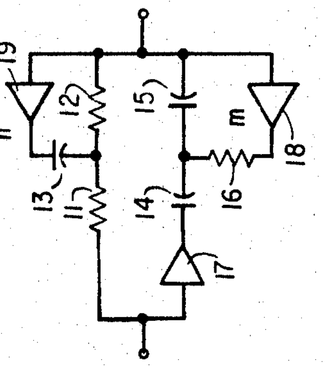

The return circuits of a shunt capacitor and a shunt resistor in a parallel-T network are shown in FIG. 1 connected to separate feedback paths. The network has a usual resistive series arm comprising resistors 11 and 12 and a shunt capacitor 13, and a capacitive series arm comprising the capacitors 14 and 15 and a shunt resistor 16. A buffer amplifier 17 with less than unity gain K is shown connected to the input of the capacitive series arm to indicate that greater voltage is supplied to the input of the resistive arm than that applied to the input of the capacitive arm so that the network has low-frequency pass characteristics.

In practice, only one buffer amplifier is used in the output circuit, but in order to illustrate separate feedback circuits more clearly, two buffer amplifiers 18 and 19 are shown in FIG. 1. A buffer amplifier 19 with a gain of *n* is shown connected from the output of the amplifier to the shunt capacitor 13, and the buffer amplifier 18 with a gain of $m$ is shown connected from the output of the network to the shunt resistor 16.

Preferably, according to this invention, the value of feedback ratio $n$ for the resistive series arm is either equal to one or to zero so that resistance of a usual voltage divider or potentiometer in the feedback path can be eliminated. Practically, in order to have the $n$ of FIG. 1 be one, the shunt capacitor 13 is connected directly to the output of a buffer amplifier which is common to both the shunt capacitor 13 and the shunt resistor 16, the buffer amplifier having a gain of one.

Figure 2:
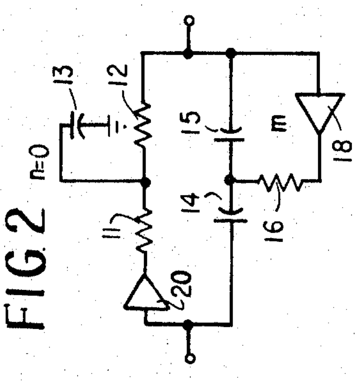
FIGS. 1 and 2 are typical simplifier schematic diagrams illustrating the principles of operation of the filter circuits of this invention.

In FIG. 2, a buffer amplifier 20 with less than unity gain K is shown connected in the input of the resistive arm to provide high-frequency pass characteristics, and the shunt capacitor 13 has one terminal connected to ground so that $n$ equals zero. Obviously, either a low-pass input connection or a high-pass input connection may be used with the feedback arrangements of FIGS. 1 and 2.

The effect of the sum of the feedback ratios $m$ and $n$ upon the characteristics of parallel-T networks is shown by the following equations. Conventionally, the resistance of the series resistors 11 and 12 of FIG. 1 is designated as R and the resistance of the shunt resistor 16 is $R/2$. Also, the capacitance of each of the series capacitors 14 and 15 is C and the capacitance of the shunt capacitor 13 is 2C. Letting $\omega_0=1/RC$, $p=j\omega$, $e_1$=input voltage to the filter section, $e_0$=output voltage, and K=the fraction of the input voltage fed forward to the capacitive series arm, the transfer function $g$ of the low-pass network of FIG. 1 can be shown to be the following complex function $$g=\frac{e_0}{e_1}=\frac{Kp^2+\omega_0^2}{p^2+2[2-(m+n)]\omega_0 p+\omega_0^2}$$

The equation for a high-pass network is similar except that $p^2$ and $\omega_0^2$ are interchanged.

The attenuation parameter $\alpha$ is shown to be:

$$\alpha=10\log_{10}\left|\frac{1}{g}\right|^2=10\log_{10}\frac{(\omega_0^2-\omega^2)^2+4[2-(m+n)]^2\omega_0^2\omega^2}{(\omega_0^2-K\omega^2)^2}$$

When the feedback paths for the shunt capacitor 13 and the shunt resistor 16 are connected together to a single potentiometer in the output of a buffer amplifier, the ratios of $m$ and $n$ must be equal, and the value of each must be greater than 0.5 in order to have complex poles in the p-plane. By separating the feedback paths for the shunt resistor and the shunt capacitor as described above, significant resistance is eliminated from the circuit of the shunt capacitor when $n$ equals zero or one, and desirable filter characteristics are obtained. When $n$ equals zero, feedback voltage is not applied to the shunt capacitor and the parallel-T filter has a monotonic ascending loss characteristic in its passband. When $n$ equals one, unity feedback is applied to the shunt capacitor to provide a pair of conjugate complex poles and a gain characteristic in the passband of the filter section. Because of the high ratio of the gain in the passband to the gain outside the passband, cascaded combinations of filter sections in which $n$ equals one approximate ideal filter characteristics as closely as the characteristics of any equivalent L–C filter network.

In designing a network with a pair of conjugate complex poles according to the equation for the transfer function $g$ as given above, the parameters are:

$$m=2+\frac{a}{\omega_0}$$

when $n=0$; and $$m=1+\frac{a}{\omega_0}$$

when $n=1$; and $$\omega_0=\frac{1}{RC}=\sqrt{a^2+b^2}$$

where $a\pm jb$ denotes the roots of the factored polynominal of the denominator of the equation given above for $g$. For both of the preferred values of $n$, the forward feed is given by $$K=\left[\frac{\omega_0}{\omega_\infty}\right]^2$$

where $\omega_\infty$ denotes the normalized radian frequency of the attenuation pole. The asymptotic value $a_\infty$ of the attenuation in the stop band can be shown to be $$a=40\log_{10}\left[\frac{\omega_\infty}{\omega_0}\right]\text{ db}$$

Figure 3:
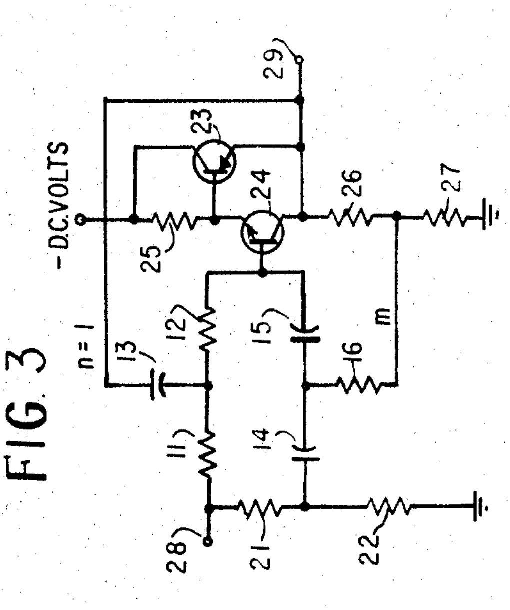
FIG. 3 is a schematic diagram of a low-pass filter section having a feedback ratio of one with respect to the shunt capacitor, and a fractional feedback ratio with respect to the shunt resistor.

A preferred low-pass parallel-T filter section is shown in FIG. 3. The usual filter components include resistors 11, 12, and 16 and capacitors 13, 14, and 15. The resistive arm comprising resistors 11 and 12 is connected directly to an input terminal 28, but the capacitive arm comprising the capacitors 14 and 15 is connected to the junction of serially connected resistors 21 and 22 which form a voltage divider across the input filter. Because of the low resistance of these resistors, they have little effect upon the impedance of the capacitive series arm. A buffer amplifier including transistors 23 and 24 connected in the output circuit of the filter, has a gain of one. A type PNP transistor 23, a type NPN transistor 24, and a resistor 25 are connected in an equivalent Darlington amplifier circuit having high input impedance and low output impedance. The emitter of the transistor 24 is connected to an output terminal 29 and is also connected through a voltage divider comprising series resistors 26 and 27 to ground. The shunt resistor 16 of the filter is connected to the junction of the resistors 26 and 27 so that $m$ is equal to the ratio of the resistance of the resistor 27 to the sum of the resistances of the resistors 26 and 27, and is independent of the value of $n$ for the low-pass arm. The shunt capacitor 13 is shown connected directly to the output of the buffer amplifier; therefore, the ratio $n$ is equal to one.

Figure 4:
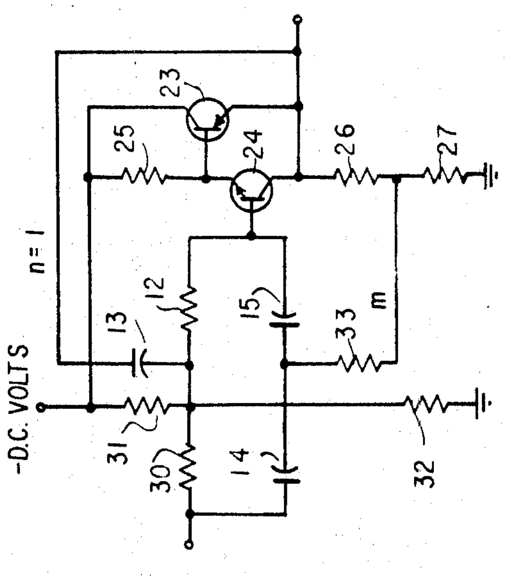
FIG. 4 is a schematic diagram of a filter section having separate feedback paths as in FIG. 3, but having high-frequency pass characteristics and in addition a biasing network for the buffer amplifier connected to the junction of the resistive series arm of the parallel-T section.

The circuit of the high-pass parallel-T filter section of FIG. 4 is like the circuit of FIG. 3 except that the input has been modified in conjunction with bias resistors to provide greater voltage to the capacitive series arm than to the resistive series arm and to provide required bias voltage to the output buffer amplifier. In the low-pass filter of FIG. 3, bias voltage can be applied directly through the series resistors 11 and 12 to the base of the transistor 24. If a voltage divider corresponding to resistors 21 and 22 of FIG. 3 were used in the high-pass filter of FIG. 4 and the series resistive arm rather than the series capacitive arm were connected to the junction of the resistors 21 and 22, insufficient bias voltage would be applied to the base of the transistor 24 from the preceding section. Therefore in FIG. 4, additional resistors 31 and 32 are connected in series across the source of direct current voltage and the junction of these resistors is connected to the junction of the resistors 30 and 12 of the series arm. Sufficient bias voltage is therefore applied through the resistor 12 to the base of the transistor 24. Whereas in FIG. 3 the value of resistor 11 is equal to the value of resistor 12, in FIG. 4 resistor 30 has been substituted for the resistor 11 and its value computed with respect to the values of the resistors 31 and 32 so that the effective resistance is equal to the value of the resistor 12. To obtain this result, the resistance $R_{31}$ of the resistor 31 is equal to the resistance $R_{32}$ of the resistor 32, and $$R_{32}=\frac{2R}{1-K}$$

where R is equal to the value of the resistance of the resistor 12 and K is equal to the friction of the input voltage applied to the resistive arm of the filter. The series resistance $R_{30}$ of the resistor 30 is equal to $R/K$. By maintaining these relationships, the impedance as viewed from the right of resistors 30, 31, and 32 remains at the usual value R while the forward feed to the series resistive arm is the fraction $$K=\frac{R_{32}}{2R_{30}+R_{32}}$$

of the input voltage.

Figure 5B:
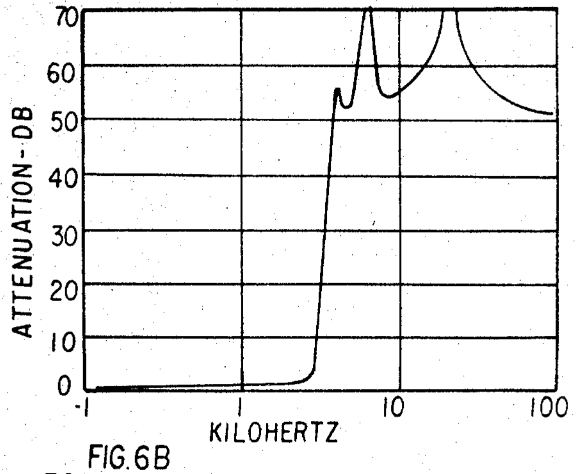
FIG. 5B is its over-all attenuation curve.
Figure 5A:
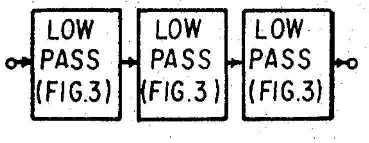
FIG. 5A is a block diagram of cascaded low-pass filter sections of FIG. 3.

The following examples show that cascaded stages of active parallel-T filter sections which have ratios of feedback voltage $n=1$ for the resistive arm, have characteristics corresponding to good L-C filters. Three low-pass filter sections of the type illustrated in FIG. 3, when cascaded as shown in FIG. 5A, provide the attenuation curve shown in FIG. 5B. This attenuation curve for a circuit having component values listed below has a cutoff frequency at 4 kHz. and the attenuation outside the passband is about 50 db greater than the attenuation within the passband.

| Components of Fig. 3 | First section | Second section | Third section |
|---|---|---|---|
| Resistors 11, 12 | 20K ohms | 20K ohms | 20K ohms |
| Resistor 16 | 9,620 ohms | 9,640 ohms | 9,930 ohms |
| Capacitors 14, 15 | 3,650 pF | 2,260 pF | 1,960 pF |
| Capacitor 13 | 7,300 pF | 4,520 pF | 3,920 pF |
| Resistor 21 | 5.76K ohms | 1.74K ohms | 845 ohms |
| Resistor 22 | 100 ohms | 536 ohms | 1.18K ohms |
| Resistor 26 | 1.5K ohms | 412 ohms | 75 ohms |
| Resistor 27 | 511 ohms | 1.5K ohms | 2K ohms |

(The value of the resistor 16 is one-half the value of the resistor 11 less the value of the resistors 26 and 27 in parallel.) The poles of highest attenuation are at 16.630 kHz. for the first section, 6.693 kHz. for the second section, and at 5.338 kHz. for the third section.

Figure 6B:
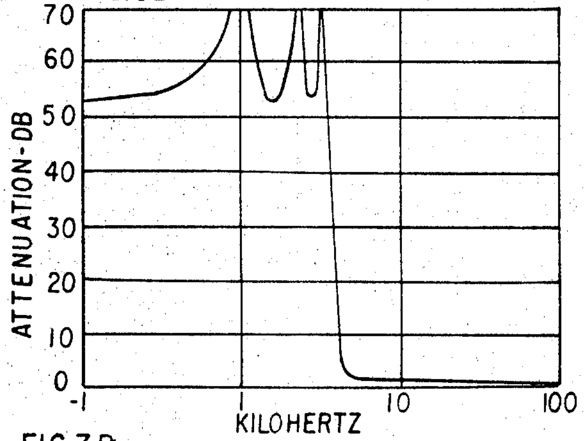
FIG. 6B is its attenuation curve.
Figure 6A:
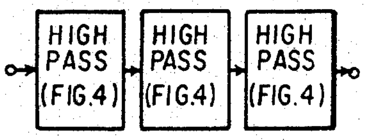
FIG. 6A is a block diagram of cascaded high-pass filter sections of FIG. 4.

Three high-pass filter sections of the kind described in connection with FIG. 4 connected in cascade as shown in FIG. 6A provide the attenuation characteristics shown in FIG. 6B. This circuit provides low attenuation for frequencies above 4 kHz., but provides attenuation greater than 50 decibels for frequencies below 4 kHz. The values of the various components of the different sections are as follows:

| Components of Fig. 4 | First section | Second section | Third section |
|---|---|---|---|
| Resistor 12 | 20K ohms | 20K ohms | 20K ohms |
| Resistor 30 | 34K ohms | 75K ohms | 1.18M ohms |
| Resistor 33 | 9,930 ohms | 9.680 ohms | 9,620 ohms |
| Capacitors 14, 15 | 2.05 nF | 1.74 nF | 1.07 nF |
| Capacitor 13 | 4.1 nF | 3.48 nF | 2.14 nF |
| Resistors 31, 32 | 95.3K ohms | 54.9K ohms | 41.2K ohms |
| Resistor 26 | 75 ohm | 412 ohm | 1.5 K ohm |
| Resistor 27 | 2K ohm | 1.5K ohm | 511 ohm |

(The value of the resistor 33 is one-half the value of the resistor 12 less the value of the resistors 26 and 27 in parallel.) The poles of highest attenuation are at 2.997 kHz. for the first section, 2.391 kHz. for the second section, and at 962 Hz. for the third section.

Figure 7B:
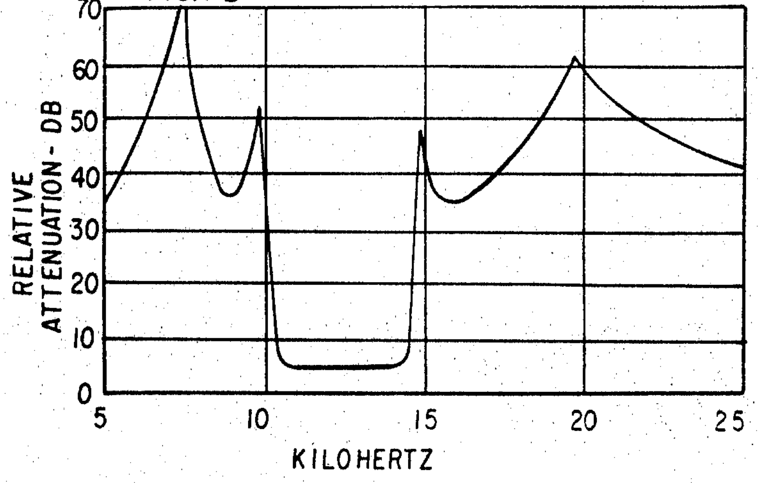
FIG. 7B is a curve of its over-all bandpass characteristics.
Figure 7A:
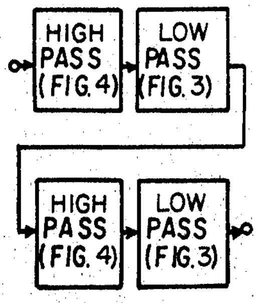
FIG. 7A is a block diagram of a band-pass filter consisting of cascaded low-pass and high-pass sections.

Finally, a four section band-pass filter of FIG. 7A comprises alternate low-pass and high-pass filter sections to provide the band-pass curve shown in FIG. 7B. The attenuation outside the band-pass is at least 30 db greater than the attenuation within the band-pass, and the variation within the band-pass is not greater than plus or minus 0.5 db. The values of the components of the circuits are as follows:

| Components of Fig. 4 | First section | Third section |
|---|---|---|
| Resistor 12 | 20K ohms | 20K ohms |
| Resistor 30 | 23.2K ohms | 44.2K ohms |
| Resistor 33 | 10K ohms | 9,860 ohms |
| Capacitors 14, 15 | 768 pF | 732 pF |
| Capacitor 13 | 1,536 pF | 1,464 pF |
| Resistors 31, 32 | 287K ohms | 73.2K ohms |
| Resistor 26 | 0 ohms | 147 ohms |
| Resistors 27 | 2K ohms | 1,780 ohms |

| Components of Fig. 3 | Second section | Fourth section |
|---|---|---|
| Resistors 11, 12 | 20K ohms | 20K ohms |
| Resistor 16 | 10K ohms | 9,890 ohms |
| Capacitors 14, 15 | 576 pF | 604 pF |
| Capacitor 13 | 1,152 pF | 1,208 pF |
| Resistor 21 | 274 ohms | 1.13K ohms |
| Resistor 22 | 1.74K ohms | 909 ohms |
| Resistor 26 | 0 ohms | 121 ohms |
| Resistor 27 | 2K ohms | 1.78K ohms |

The poles of highest attenuation are at 9.533 kHz. for the first section, 15.1 kHz. for the second section, 7.342 kHz. for the third section, and at 19.61 kHz. for the fourth section.

Filters according to these examples are adaptable to integrated circuits so that filters for sub-audio, voice, and carrier frequency filters may be decreased in size as much as three-fourths in comparison with prior L-C filters. Also the cost of these filters is less than the cost of those filters using iron-core inductors.

We claim:

1. In an active parallel-T filter of the type having a resistive series arm with a shunt capacitor and a capacitive series arm with a shunt resistor, a buffer amplifier with a gain of approximately one, connected in the output circuit of said filter, said filter being modified for operation with full input voltage applied to said capacitive series arm and a fractional amount of said input voltage applied to said resistive series arm, said resistive series arm having first and second series resistors, said first series resistor being connected to the input of said capacitive series arm according to a conventional arrangement, said second series resistor having a conventional value of resistance designated as R, the value of said first series resistor being $R/K$, where K equals the desired effective ratio of input voltage applied to said resistive series arm to the input voltage applied to said capacitive series arm, two bias resistors connected in series for connection across a source of bias voltage to apply proper bias voltage to said buffer amplifier, the junction of said bias resistors being connected to the junction of said first and second series resistors.

References Cited

UNITED STATES PATENTS 3,369,189 2/1968 Hoffman et al. ______ 330—109

OTHER REFERENCES

Farrer: "A Simple Active Filter With Independent Control Over the Pole and Zero Locations," Electronic Engineering, April 1967, pp. 219–222.

Douce et al.: "A Simple Null Filter With Variable Notch Frequency," Electronic Engineering, July 1964, pp. 478–479.

ROY LAKE, Primary Examiner

J. B. MULLINS, Assistant Examiner

U.S. Cl. X.R.

330—28, 31, 103, 108, 109